United States Patent [19]

Okada et al.

[11] 3,767,548
[45] Oct. 23, 1973

[54] METHOD AND APPARATUS FOR CONTINUOUS DEMINERALIZATION IN FOOD PROCESSING PLANTS

[75] Inventors: Katsuto Okada; Mamoru Tomita; Minobu Ono; Katsuharu Yamazaki; Juichi Ohkuma, all of Tokyo, Japan

[73] Assignee: Morinaga Nyugyo Kabushiki Kaisha, Tokyo, Japan

[22] Filed: July 15, 1971

[21] Appl. No.: 162,776

[30] Foreign Application Priority Data
Aug. 1, 1970 Japan.............................. 45/67632

[52] U.S. Cl.............................. 204/180 P, 204/301
[51] Int. Cl............................................ B01d 13/02
[58] Field of Search.......................... 204/180 D, 301

[56] References Cited
UNITED STATES PATENTS
3,440,159   4/1969   McRae et al.................... 204/180 P

OTHER PUBLICATIONS

Ionics, Inc., "Fresh Water from Saline Sources," (1957), Bulletin No. 3, Ionics, Inc., Cambridge, Mass.
Wilson, "Demineralization by Electrodialysis," (1960) pp. 224–228, TD 433 P7 C2.

Primary Examiner—Howard S. Williams
Assistant Examiner—A. C. Prescott
Attorney—Kurt Kelman

[57] ABSTRACT

A method and apparatus adapted for automatically controlled operation in powdered milk plants and other food processing plants. The method and apparatus are particularly suited for demineralizing milk and other liquids which are likely to degenerate by temperature conditions and the like during demineralization through a continuous processing that involves no degeneration of the product obtained and is well suited for automatic controlling.

6 Claims, 4 Drawing Figures

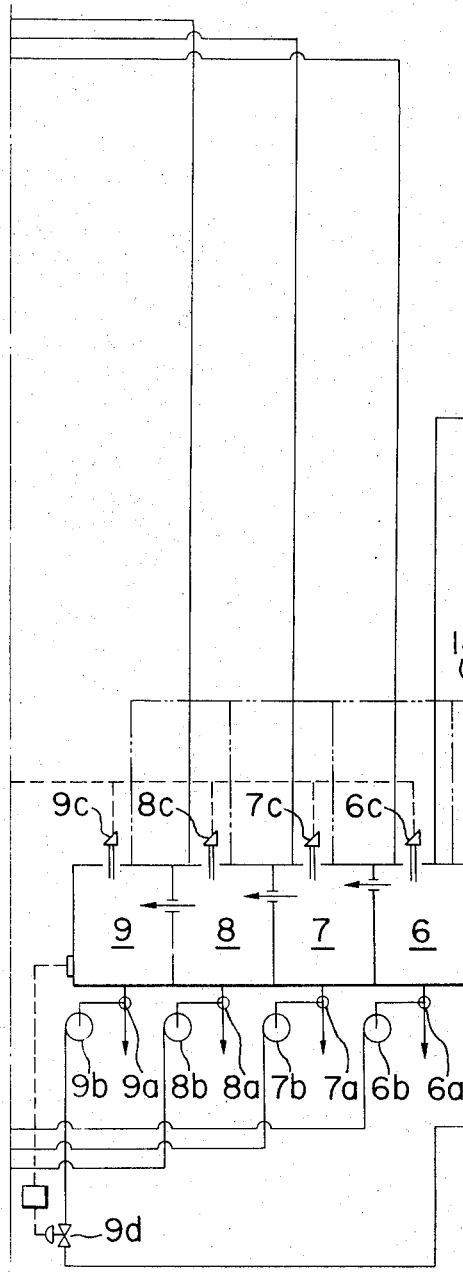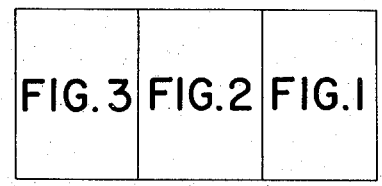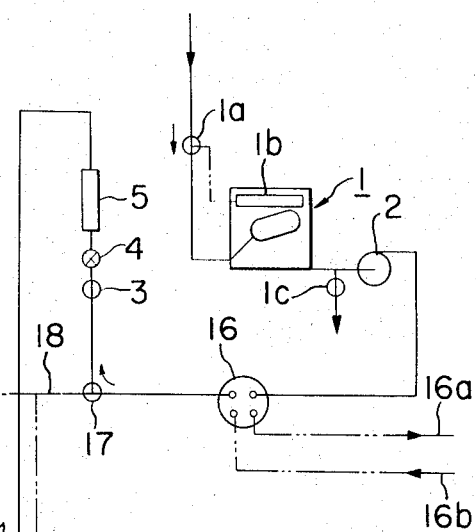
FIG. 1
FIG. 4
| FIG. 3 | FIG. 2 | FIG. 1 |
INVENTORS
KATSUTO OKADA
MAMORU TOMITA
MINOBU ONO
KATSUHARU YAMAZAKI
JUICHI OHKUMA
BY Kurt Kelman
AGENT

METHOD AND APPARATUS FOR CONTINUOUS DEMINERALIZATION IN FOOD PROCESSING PLANTS

BACKGROUND OF THE INVENTION

FIELD OF THE INVENTION

The present invention relates to an electrical demineralization method and apparatus employing ion-exchange membranes. More particularly, the present invention relates to a method and apparatus which electrically demineralize those liquids which tend to cause troubles, such as the deteriorated quality, coagulation, multiplication of bacteria and putrefaction that are especially frequent with milk and the like food due to the temperature conditions, processing time and so on during demineralization operation and which effects such demineralization with a relatively small number of dialyzer cells in a relatively short period of time employing a continuous process instead of a batch processing that is readily adaptable to automatic controls.

Electrical demineralization apparatus of the type employing ion-exchange membranes have hitherto been used widely in various processing plants for such purposes as the demineralization of underground water and sea water. The demineralization apparatus have also been used for concentration of sea water and removal of ash contained in fruit juices as well as for the removal of ash in raw milk employed in the manufacture of powdered milk for babies.

However, with the food processing plants, particularly powdered milk plants, such demineralization processing has been responsible for the deterioration of materials to be processed and various other troubles, since the materials to be processed must be heated to obtain an improved demineralization efficiency and a long processing time is required.

It is believed to be desirable that the composition of powdered milk for babies should be as close to that of mother's milk as possible. The ash content of mother's milk is usually on the order of 0.2 percent, while the ash content of milk is generally on the order of 0.7 percent. Therefore, milk which is a raw material for baby powdered milk must be subjected to a demineralization processing. In order to carry out the required demineralization efficiently, the temperature of milk should preferably be on the order of 40°C to obtain an improved current efficiency. However, when subjected to such temperature conditions, milk tends to be quite readily contaminated with bacteria and hence it is very easily turned sour. It is thus preferable that milk should be demineralized at temperatures ranging from 15° to 20° C. However, since such low temperatures tend to deteriorate the current efficiency, the processing time must be extended considerably to compensate therefor.

On the other hand, it is desirable that the operation of a powdered milk plant be automatically controlled ranging from the pasturization, demineralization, concentration, preparation, drying and packaging steps. In the past, however, milk has been demineralized in batches and hence the demineralized milk has been supplied to the next processing step only intermittently. The reason is that with the conventional electrical demineralization apparatus employing ion-exchange membranes, any attempt to make the apparatus compact would require to feed milk from a storage tank to the demineralization apparatus in circulation and hence it would be necessary to keep the milk from being supplied to the next processing step until the whole amount of the milk in the storage tank had attained the desired mineral concentration.

Theoretically, a large number of dialysis cells with ion-exchange membranes may be connected in a tandem arrangement so that milk to be processed is supplied continuously to provide the demineralized milk in a continuous manner. In fact, however, the use of such a tandem demineralization apparatus is extremely uneconomical, since it requires a very large number of dialysis cells.

While the conventional demineralization apparatus has been described as applied to the production of powdered milk, other food processing plants including other milk processing plants and fruit juice processing plants involve similar difficulties.

Generally, with a batch type demineralizer adapted to supply a raw material for baby powdered milk, it would require about 7 hours to process 10 tons of milk maintained at a temperature of 9°C so as to reduce the mineral concentration to the desired value. Thus, even if the temperature of milk were sufficiently reduced, such a long processing time required for demineralization would cause troubles, such as the deteriorated quality or taste of powdered milk product, clogging in the dialysis cells during demineralization operation and inability to accomplish a perfect cleaning of the apparatus.

For example, when milk is to be demineralized, it should be preferably processed at temperatures between 20° and 40°C from a stand-point of efficient demineralization, since milk contains protein and carbohydrate considerably thus requiring electrical demineralization methods different from those used with sea water and underground water. In this case, however, the processing time must be reduced considerably in order to prevent the multiplication of bacteria. With the conventional batch type demineralization methods, it has been observed that any of the aforementioned troubles usually occurred at temperatures in excess of 12°C. Similarly, when the demineralization temperature was reduced to some extent, a rise in the acidity of product obtained or loss in the thermal stability of protein was observed. Furthermore, in proportion to increase in the processing temperature or time, or as the pH value was varied by an overvoltage (neutral disturbance or concentration polarization phenomenon), protein coagulated and moreover calcium and phosphor radical contained in the milk produced scales of calcium phosphate so that they tended to deposit on the inside of dialysis cells, thereby causing the dialyzer cells to get clogged. Even if the cells were not caused to get clogged, the deposition of a large amount of such scales often resulted in the breakage of ion-exchange membranes during frequent cleaning operations of the demineralization apparatus including the dialysis cells. These trobules are substantially different from the troubles which would be found in the demineralization of liquids, such as sea water and underground water which are composed of inorganic substances.

SUMMARY OF THE INVENTION

According to the present invention, there are provided a demineralization method and apparatus therefor wherein a continuously supplied raw material is received in a continuous manner to circulate it for demineralization through a unit comprising a holding tank and an associated electro-dialysis cell and at the same time the liquid thus processed is caused to overflow, in an amount corresponding to the amount of the raw material to be continuously supplied, into the adjoining holding tanks of similar units in succession to effect the required demineralization on the overflown liquid, whereby the product having a desired mineral concentration is continuously discharged from the final stage unit. The present invention further provides a method and apparatus therefor wherein the degree of demineralization of the liquid in each of a plurality of holding tanks is continually measured so that when the mineral concentration in the demineralized product in the final stage holding tank is in short of the desired value, the raw material supply to the first stage holding tank is limited to reduce the amount of the material to be overflown to the succeeding tanks and in this way a product with the desired mineral concentration is obtained.

In other words, according to the present invention, a large quantity of raw material liquid to be demineralized is stored in a storage tank and the liquid is supplied from this tank to a plurality of circulating demineralization units through a discharge regulator valve. Each of said circulating demineralization units comprises a holding tank of a relatively small volume and an associated electro-dialysis cell, and the raw material supplied to the holding tank is circulated by a pump through the electro-dialysis cell employing ion-exchange membranes so that the material is returned to the holding tank after being demineralized in said cell. The raw material is heated and efficiently demineralized by means of a hot sodium chloride solution circulated among the interposed ion-exchange membranes. At the same time that the liquid to be processed is circulated in these units, the liquid in the holding tank of the first unit is discharged into the holding tank of the next unit in an amount corresponding to the amount of the raw material to be continuously supplied to the first unit. Thus, a similar demineralization of the liquid is performed by the holding tank of the next unit as well as by those of the next succeeding units. In this way, the product holding tank of the final unit continuously discharges a product whose mineral concentration has been reduced to the desired value. The electric conductivity of the liquid in each of the holding tanks of the preceeding circulating demineralization units and in the product holding tank of the final stage is continually measured so that the measured values are indicated at the central control panel and at the same time the discharge regulator valve for supplying the raw material is controlled according to the results of the measurements. Thus, the mineral concentration in the product can be always maintained at the desired value. Moreover, since the amount of liquid contained in each of the holding tanks of the units and the amount of liquid in the pipes of the circulating system or the supply and discharge systems are small as compared with the amount of liquid stored in the conventional batch type apparatus, the time during which the liquid to be processed is subjected to the demineralization operation may be reduced considerably.

Therefore, the principal object of the present invention is to provide a method and apparatus which is capable of continuously supplying raw material to continuously deliver the demineralized product even with a smaller number of ion-exchange membranes.

Another object of the present invention is to provide a method and apparatus which, even with a smaller number of dialyzer cells, is capable of performing the required demineralization without any deterioration of the product obtained and with a shorter retention time of the material in the apparatus.

The above and other objects and advantages of the present invention will be readily apparent from the following description of the invention when taken in conjunction with the accompanying drawings.

BRIEF DESCRIPTION OF THE DRAWINGS

FIGS. 1 through 3 illustrate, when combined in this order from the right to the left as shown in FIG. 4, a flow diagram showing an embodiment of the present invention, in which FIG. 1 illustrates chiefly the flow of a material to be processed which is milk; FIG. 2 illustrates in the upper portion of the diagram first and second demineralization dialysis cells employing ion-exchange membranes; and FIG. 3 illustrates a third dialyzer cell, storage tank of sodium chloride solution and circulating pathes.

DESCRIPTION OF THE PREFERRED EMBODIMENT

Figure 2:
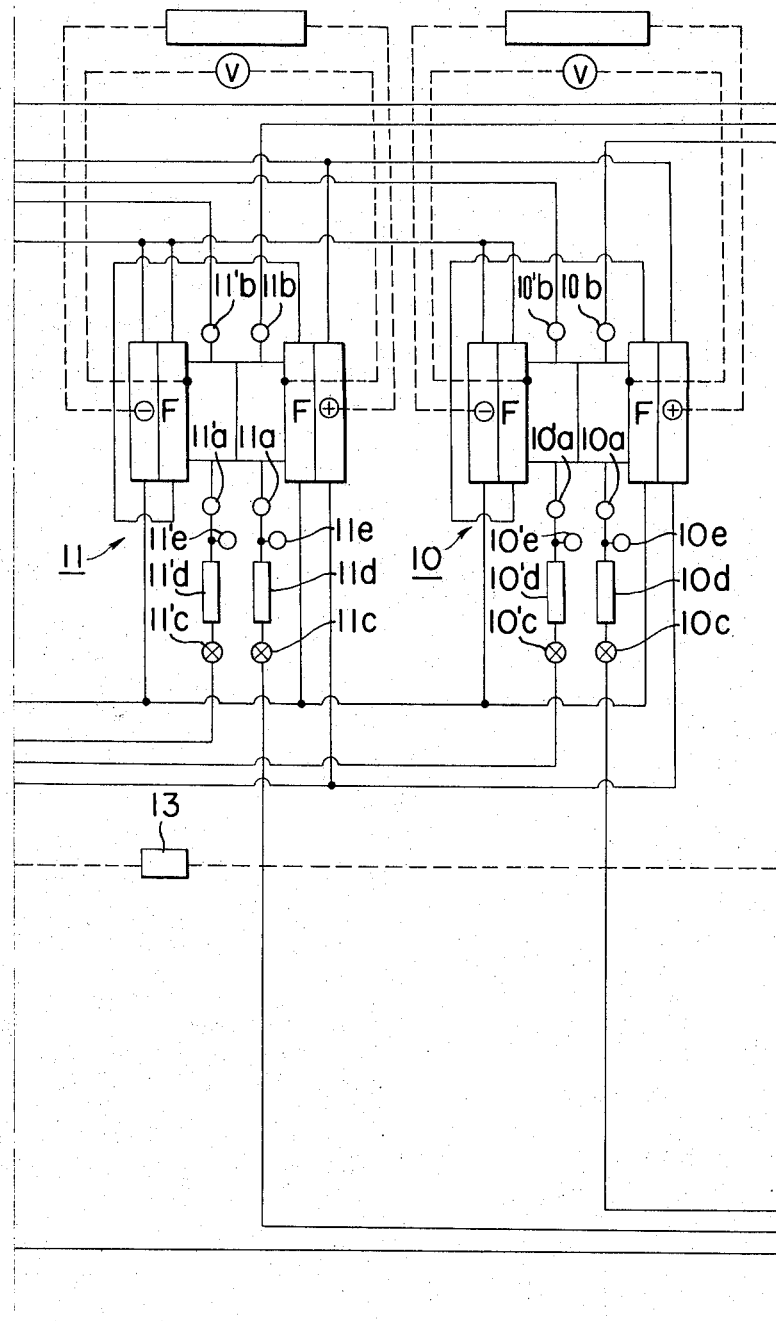
Figure 3:
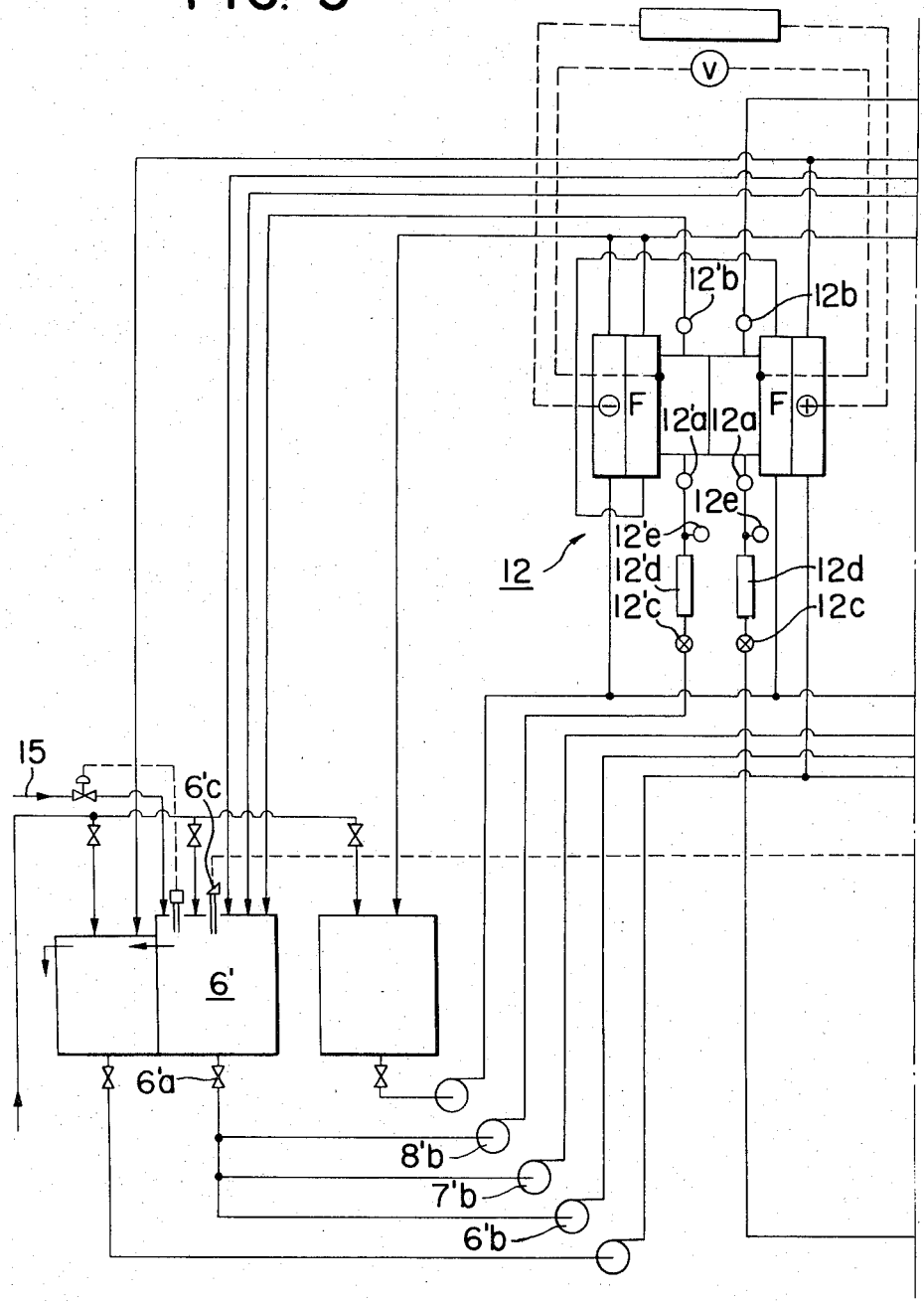

Raw material milk which is to be demineralized is stored in a buffer tank or balance tank 1 after being subjected to the necessary preliminary processing such as sterilization. The milk stored in the balance tank 1 is supplied to the demineralization apparatus by means of a pump 2. The output line of this feed pump 2 is connected to a holding tank 6 of a first circulating demineralization unit through a valve 3 for automatic on-off control of the flow rate, a mannually operated discharge regulator valve 5 and a flow meter 5.

Disposed in juxtaposition with the first holding tank 6 are second and third holding tanks 7 and 8, and further disposed next to the third holding tank 8 is a tank 9 for containing therein the product milk having its mineral concentration reduced to the desired value. The first, second and third holding tanks are provided with their respective output lines to which are connected drain valves 6a, 7a and 8a and feed pumps 6b, 7b and 8b, respectively.

The outputs from the feed pumps connected to the holding tanks are coupled to input headers 10a, 11a and 12a of electro-dialysis cells 10, 11 and 12 arranged in operatively associated relation with the respective holding tanks. Output headers 10b, 11b and 12b of the electro-dialysis cells are connected back to the associated holding tanks for returning the liquid. In addition, manual flow control valves 10c, 11c and 12c, flow meters 10d, 11d and 12d and pressure gages 10e, 11e and 12e are disposed on the lines interconnecting the said feed pumps and the input headers of the respective electro-dialysis cells.

Similarly, aqueous solution of sodium chloride is pumped from a storage tank 6' through a valve 6a' to the electrical dialyzer cells 10, 11 and 12 by pumps 6b', 7b' and 8b', respectively, so that the solution is received at input headers 10a', 11a' and 12a', respectively. Output headers 10b', 11b' and 12b' of the electro-dialysis cells are connected back to the storage tank 6' for returning the solution thereto. When the mineral concentration in the salt solution gets higher, it will be diluted suitably with water. In addition, flow control valves 10c', 11c' and 12c', flow meters 10d', 11d' and 12$d'$ and pressure gages 10$e'$, 11$e'$ and 12$e'$ are disposed on the lines interconnecting the feed pumps 6$b'$, 7$b'$ and 8$b'$ and the input headers 10$a'$, 11$a'$ and 12$a'$ of the electro-dialysis cells.

Each of the electro-dialysis cells 10, 11 and 12 comprises a plurality of interconnected chambers for circulating the liquid to be demineralized and a plurality of similar aqueous sodium chloride circulating chambers. These chambers are alternately arranged through the intermediary of a plurality of cation and anion exchange membranes and they are also interposed between outer clamping frame chambers F and chambers having immersed therein a positive electrode and a negative electrode, respectively. In the drawings, however, the plurality of these dialysis chambers are omitted and instead they are shown as represented by the single liquid circulating chamber and the single aqueous sodium chloride circulating chamber, respectively.

Electric conductivity measuring devices 6$c$, 7$c$, 8$c$ and 9$c$ are provided to measure the mineral concentration in the liquid in each of the holding tanks 6, 7 and 8 and the product holding tank 9, and the values of measurements are indicated at a central control panel 13.

The product flown into the product holding tank 9 by successively overflowing the holding tanks 6 through 8 is pumped out therefrom by a pump 9$b$ to the utilization system and the amount of discharge is regulated by a product discharge valve 9$d$ which is adapted to be actuated by the air pressure that increases or decreases according to the liquid level in the tank 9.

The electric conductivity measuring device 8$c$ disposed in the holding tank 8 to measure the mineral concentration in the product flown thereinto is also designed to perform, for example, the on-off control of the previously mentioned raw material feed valve 3.

The product milk pumped out by the pump 9$b$ will be supplied to the succeeding utilization system after being suitably cooled or without being so cooled.

The operation of the apparatus described above will now be explained hereunder.

Milk to be demineralized is first stored in the buffer tank 1. The raw material milk thus stored is pumped out by the feed pump 2 so that it reaches the manual valve 4 and the flow meter 5 through the stop valve 3 which is designed for automatic on-off control. The manual valve 4 determines the amount of liquid which is to be overflown from the holding tanks and the automatically controlled stop valve 3 functions to temporarily stop the flow of the liquid.

A fixed amount of the raw material milk determined by the valve 4 is admitted into the first holding tank 6. The milk will be fed into the tank 6 at a temperature of about 5°C. Then, the pump 6$b$ pumps out to the electrical dialyzer cell 10 the milk contained in the holding tank 6 which will be about 100$l$, for example.

The milk to be demineralized is then admitted through the manually adjusted valve 10$c$ into the electro-dialysis cell 10 from its dilution side header or the input end 10$a$. On the other hand, aqueous solution of sodium chloride is admitted into the concentration portion of the electro-dialysis cell 10 from the tank 6′ after being heated up to about 20° under the heat from a steam circuit 15. Thus, the milk is demineralized in the atmosphere of about 20°C through the ion-exchange membranes and it is then returned to the holding tank 6.

The milk returned into the holding tank 6 is then mixed with raw material milk continually supplied thereto so that the mixed liquid is recirculated by the pump 6$b$ through the electro-dialysis cell 10 back to the holding tank 6. In this manner, the demineralization of the milk is effected so that the mineral concentration in the milk in the first holding tank 6 is eventually reduced to a predetermined value. On the other hand, since raw material milk is continually fed into the holding tank 6, the liquid in the holding tank 6 is caused to overflow into the second holding tank 7 in an amount corresponding to the amount of continually supplied raw material milk.

The milk thus overflown into the second holding tank 7 is processed in the similar manner as described in connection with the milk in the holding tank 6, so that the mineral concentration in the milk that is to be overflown into the third holding tank 8 is reduced to a value still lower than the value in the preceeding stage. A similar process is also repeated in the holding tank 8, thereby reducing the mineral concentration to a value required of a product milk that is to be overflown from the holding tank 8.

The mineral concentration in the milk contained in each of the holding tanks 6, 7 and 8 is measured by the electric conductivity meter 6$c$, 7$c$ and 8$c$, respectively, and is supervised by the operator at the control panel 13 so that the valve 4 is set to regulate the flow rate to a proper value. If the mineral concentration is in short of the predetermined value in the holding tanks 6, 7 and 8, the automatic valve 3 will interrupt the supply of raw material so that a relatively increased amount of the liquid is circulated through the electro-dialysis cells to eventually reduce the mineral concentration.

The milk thus demineralized is admitted to overflow from the tank 8 into the product holding tank 9. The valve 9$a$ designed to be opened or closed according to the liquid level in the product holding tank 9 regulates the amount of discharge so that the product milk is pumped out from the tank 9 by the pump 9$b$ to the succeeding utilization system at the rate of about 1,300$l/h$.

According to an example, the total amount of milk present throughout the whole demineralization units, the product holding tank and the associated piping was approximately 700$l$. Thus, since the flow rate of milk is on the order of 1,300$l/h$, the retention time of the milk in the demineralization apparatus can be reduced to 35 minutes or so. Thus, there is no danger of any deterioration in the quality, taste and the like of the product obtained and moreover there is no possibility of any troubles throughout the whole process.

The demineralization apparatus described above is further provided with additional cleaning lines to permit a cleaning of the demineralization apparatus in its place without disassembling the apparatus.

In other words, a wash liquid feel line (not shown) for the buffer tank 1 is connected to its raw material milk feed line. The wash liquid fed through the wash liquid feed line is sprayed into the tank 1 from a stationary wash liquid sprayer 1$b$ through a passage (indicated by a dotted line) leading from an automatic three-way valve 1$a$. The wash liquid used to clean the tank 1 is discharged by way of a drain 1$c$, or alternatively it is discharged into an exhaust pipe 16$a$ of an automatic change-over device 16 through the pump 2.

On the other hand, the holding tanks 6, 7 and 8 are cleaned in their place with a cleaning substance directed thereinto through a wash liquid feed line 16b connected by the automatic change-over device 16 and through an automatically operated three-way valve 17 and a cleaning pipe line 18. In this case, the raw material feed valve 3, manual valve 4 and automatically operated three-way valve 17 are also cleaned with a portion of the cleaning liquid admitted thereinto. The product holding tank 9 is also cleaned as with the holding tanks 6, 7 and 8.

The cleaning liquid in the holding tanks 6, 7 and 8 is directed into the electro-dialysis cells 10, 11 and 12 to clean them, while the cleaning liquid in the holding tank 9 is directed by the pump 9b to the downstream thereof to clean the pump.

It is now apparent from the foregoing that according to the method and apparatus of the present invention, with electro-dialysis cells substantially the same in number with those used in the conventional batch type demineralizer, it is possible to properly control the mineral concentration in the product obtained according to the mineral concentrations in the liquids to be demineralized at the intermediate stage of a continuous demineralization process, that is, according to the mineral concentration in the liquid in each of the first and second holding tanks. It is also possible to adapt the method and apparatus of the present invention for automatic centralized controls which ensure the production of uniform products.

The continuous demineralization process according to the present invention ensures a very short retention time of material with substantially the same number of dialysis cells as used in the conventional batch type demineralizer. More particularly, when the demineralization is combined with the preceeding and succeeding production steps so that the demineralization is carried out as a part of the continuous process, the retention time of material in the demineralization apparatus can be effectively reduced. Accordingly, the demineralization temperature of milk can be raised up to about 20°C with the resultant synergetic improvement in the demineralization efficiency.

Furthermore, according to the method and apparatus of the present invention, the electro-dialysis cells can be separately handled as individual units and thus these cells can be cleaned efficiently in their place. This has an effect of considerably lessening the danger of damages to the ion-exchange membranes as compared with the conventional cleaning in disassembly.

We claim:

1. A method for continuous demineralization of liquid food, said method comprising the steps of: substantially continually supplying a fixed amount of liquid food material into a first holding tank; successively passing said material from the first holding tank and into a first unit of a plurality of interconnected demineralization units, each of said demineralization units comprising an electro-dialysis cell employing ion-exchange membranes and a holding tank for holding therein said liquid during demineralization by said dialysis cell; continually circulating said liquid in said holding tank of said first unit by a pump through said dialysis cell back to said holding tank to thereby effect the demineralization of said liquid; successively overflowing said liquid from said first unit holding tank and successively into said adjoining units to effect a further demineralization of said liquid in corresponding dialysis cell of each said unit concurrent with demineralization in said first unit, the amount of material processed through the units being determined by the amount supplied to said first unit; and receiving into a product holding tank the product overflowing from the last of said units, said liquid food product being demineralizaed to attain a desired mineral concentration.

2. The method of claim 1 further comprising the steps of detecting the mineral concentration in said liquid in each holding tank of said units, said detecting being effected by variations in electrical conductivity of said liquid, and means for controlling the supply of said liquid material according to detected values of said electrical conductivity to thereby regulate the mineral concentration to the desired value.

3. The method of claim 2 wherein values of electrical conductivity for controlling the initial supply of liquid material consist of values detected in the holding tank of the last of said circulating demineralization units.

4. A continuous demineralization apparatus for use in liquid food processing plants comprising in combination, a raw material storage tank; a plurality of circulating demineralization units, each of said units comprising an electro-dialysis cell employing ion-exchange membranes and a holding tank storing a liquid to be demineralized by being repeatedly supplied to said dialysis cell; and a product holding tank for receiving a demineralized product, said raw material storage tank disposed for supplying liquid raw material to the holding tank of said first unit through valve means, and the holding tank of each of said units being adapted to receive liquid overflown from the holding tanks of a preceding unit with means to circulate said liquid in said holding tanks by associated pumps through corresponding dialysis cells.

5. The apparatus of claim 4 wherein said holding tanks of said circulating demineralization units are provided with means for measuring electric conductivity of the liquid therein and feed valve means disposed for controlled operation by said electric conductivity measuring means to thereby maintain the mineral concentration in the product within said holding tank at a predetermined value.

6. The apparatus of claim 4 wherein said raw material storage tank, said circulating demineralization units and said product holding tank are provided with separate cleaning liquid supply and collecting lines.

* * * * *